(12) United States Patent
Bhatia et al.

(10) Patent No.: US 7,060,122 B2
(45) Date of Patent: Jun. 13, 2006

(54) OIL SEPARATOR FOR A COMPRESSOR

(75) Inventors: Kanwal Bhatia, Troy, MI (US); Eric Bryan Gheen, Dearborn, MI (US); Aurelian Bahmata, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 289 days.

(21) Appl. No.: 10/679,554

(22) Filed: Oct. 6, 2003

(65) Prior Publication Data

US 2005/0072307 A1 Apr. 7, 2005

(51) Int. Cl.
*F01C 1/00* (2006.01)
*B01D 19/00* (2006.01)

(52) U.S. Cl. ............ 96/204; 96/220; 418/55.6; 418/DIG. 1

(58) Field of Classification Search .......... 55/462, 55/465; 62/470; 417/313; 418/55.6, DIG. 1; 96/204, 220
See application file for complete search history.

(56) References Cited

U.S. PATENT DOCUMENTS

| | | | |
|---|---|---|---|
| 5,062,773 A | 11/1991 | Kawai et al. | |
| 5,421,708 A | * 6/1995 | Utter et al. | ............... 418/55.6 |
| 5,580,224 A | 12/1996 | Ikeda et al. | |
| 5,733,107 A | 3/1998 | Ikeda et al. | |
| 5,823,294 A | 10/1998 | Mizutani et al. | |
| 6,179,578 B1 | 1/2001 | Kayukawa et al. | |
| 6,206,648 B1 | 3/2001 | Kimura et al. | |
| 6,481,240 B1 | 11/2002 | Strikis et al. | |
| 6,494,930 B1 | 12/2002 | Strikis et al. | |
| 6,497,114 B1 | 12/2002 | Strikis et al. | |
| 6,511,530 B1 | 1/2003 | Iwanami et al. | |
| 2002/0127117 A1 | 9/2002 | Fujii et al. | |
| 2002/0159894 A1 | 10/2002 | Fujii et al. | |

* cited by examiner

*Primary Examiner*—Robert A. Hopkins
(74) *Attorney, Agent, or Firm*—Brinks Hofer Gilson & Lione

(57) ABSTRACT

An oil separator for a compressor includes a wall with an inner surface defining an inner chamber. The inner chamber includes an oil accumulation region and a separator region with an impingement surface. A mixture inlet provides a passageway for an oil and gaseous refrigerant mixture to flow from the exterior of the separator into the inner chamber. Oil is separated from the mixture as the mixture impinges against the impingement surface. The separated oil drains into the accumulation region and exits the separator through the oil outlet. A gas outlet provides a passageway for the gaseous refrigerant from the separator region and out of the separator.

5 Claims, 7 Drawing Sheets

OIL SEPARATOR FOR A COMPRESSOR

BACKGROUND

The present invention relates generally to an oil separator for a compressor. More specifically, the present invention relates to an oil separator that separates oil from gaseous medium by impingement.

In a typical automotive air conditioning system, a mixture of oil and refrigerant enters the compressor through its suction port and is compressed through a reciprocating action of one or more pistons. The compressed, high-pressure refrigerant-oil mixture exits from the compressor through discharge ports to make its cyclic journey around the air conditioning system.

The aforementioned system is known as "oil in circulation." Although the oil is carried around the entire air conditioning system and lubricates the compressor upon entering the compressor as a mixture within the refrigerant, the compressor is the only component in the system that requires constant lubrication. Thus, as the oil refrigerant mixture circulates through the system, the oil coats on the tubes and fins of the condenser and evaporator. The presence of oil on the tubes and fins of the heat exchanger compromises the heat transfer efficiency of the system. Hence, the customer feels warmer air being discharged from the vehicle's registers. The oil that coats the heat exchanger is ultimately wasted because it does not cycle back to the compressor. With the advent of micro-channel heat exchangers, the likelihood that the oil will clog up the narrow tubes is more probable.

Moreover, in a clutchless compressor, the compressor never entirely shuts off. That is, instead of cycling off to prevent refrigerant flow, the compressor reduces its displacement and minimizes the flow of refrigerant. This type of compressor also features a check value which prevents any undesired flow of refrigerant from entering the air conditioning system. Because the compressor has not cycled off, but has merely reduced its displacement volume, the internal components are still in motion and are therefore generating friction and heat. Hence, these components still require constant lubrication. This lubrication, however, is not available under such conditions with the conventional oil in circulation technique. Thus, the compressor must rely on whatever oil has been retained within the compressor to lubricate the components.

From the above, it is seen that there exists a need for an improved oil separator for air conditioning compressors.

BRIEF SUMMARY

In overcoming the above mentioned and other drawbacks, the present invention provides an oil separator for a compressor that includes a wall with an inner surface defining an inner chamber. The inner chamber includes an oil accumulation region and a separator region with an impingement surface. A mixture inlet provides a passageway for an oil and gaseous refrigerant mixture to flow from the exterior of the separator into the inner chamber. Oil is separated from the mixture as the mixture impinges against the impingement surface. The separated oil drains into the accumulation region and exits the separator through the oil outlet. A gas outlet provides a passageway for the gaseous refrigerant from the separator region and out of the separator.

Other features and advantages will be apparent from the drawings, detailed description, and claims.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1A:
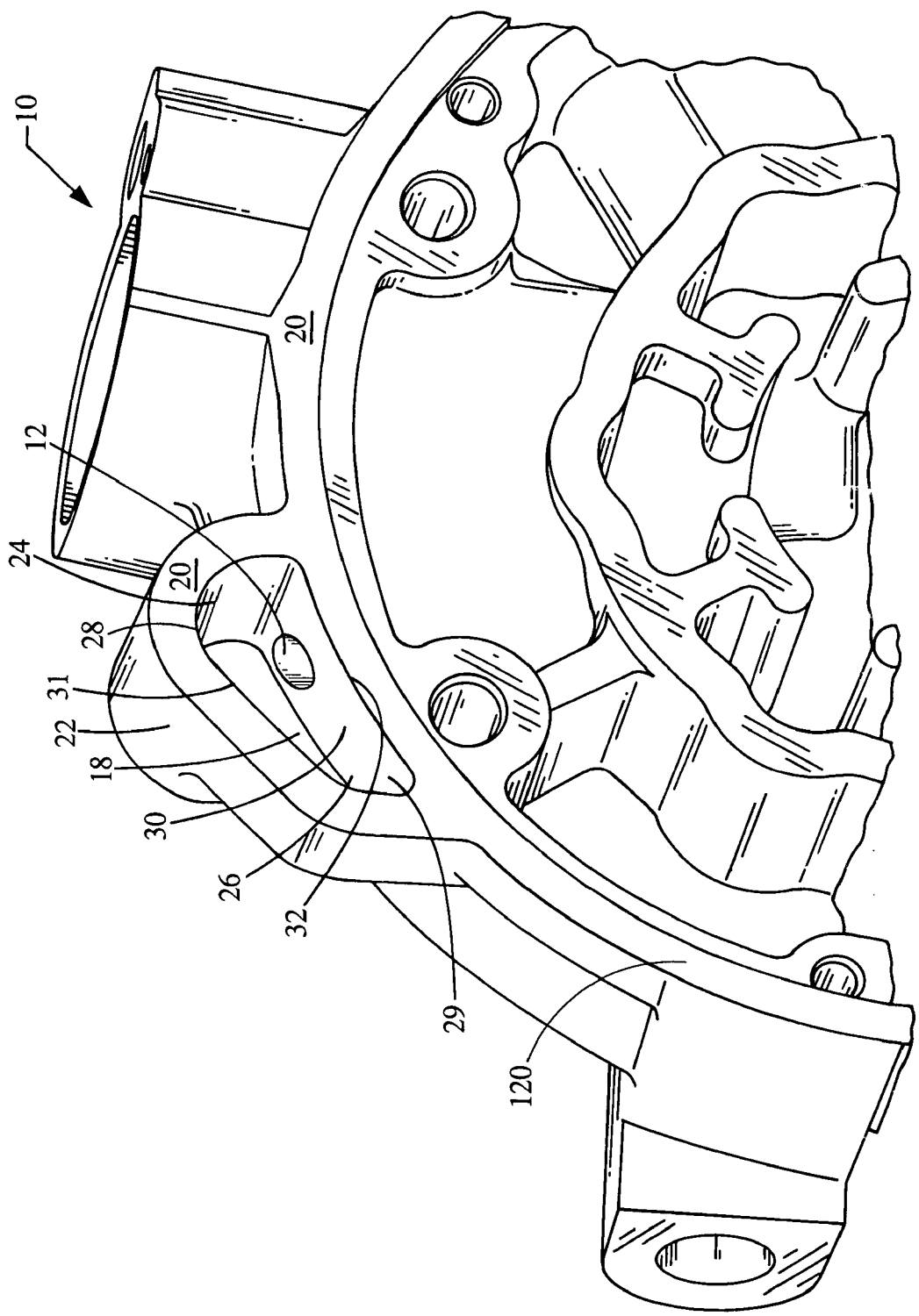
FIG. 1A is a perspective view of an oil separator for a swashplate compressor in accordance with the invention.
Figure 1B:
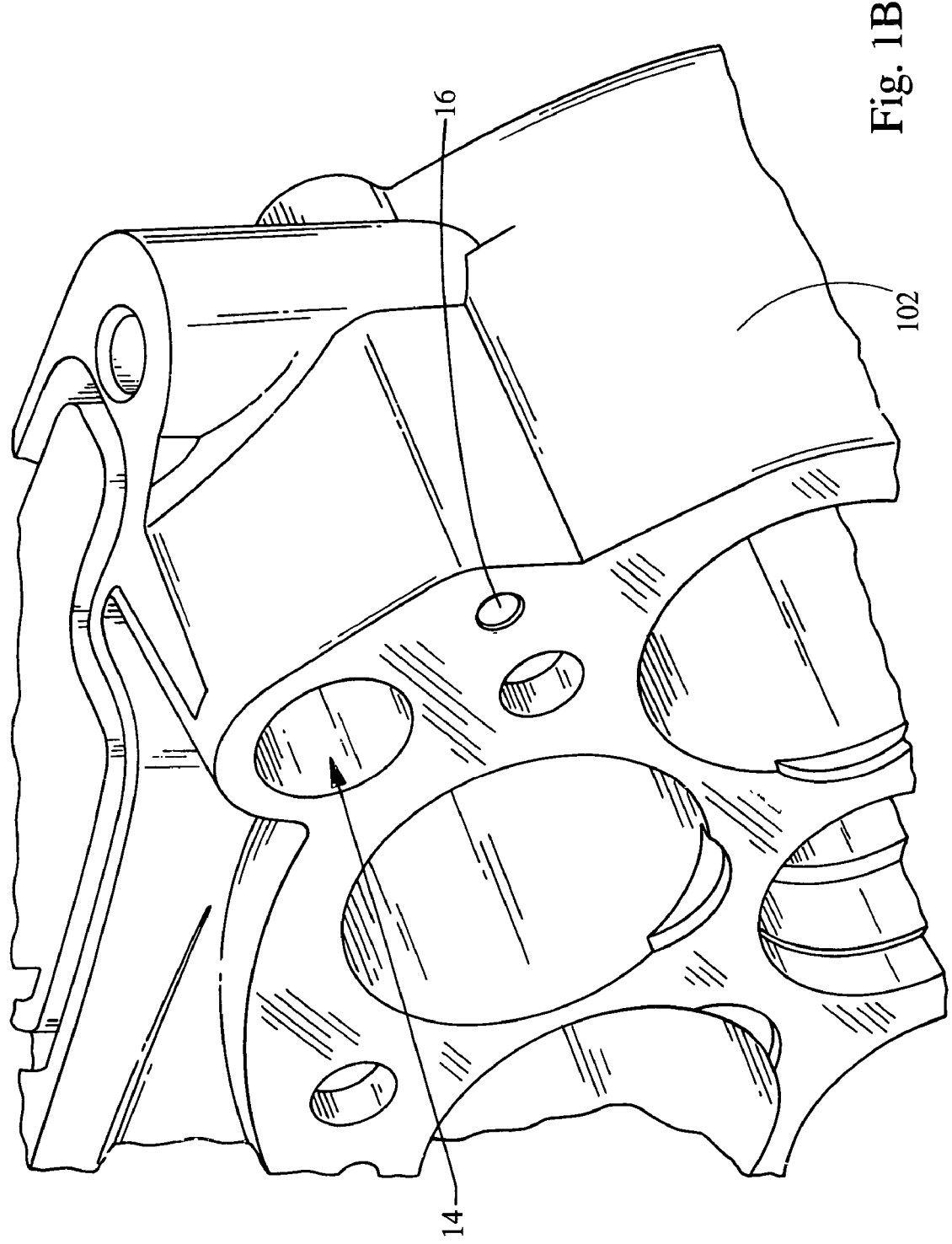
FIG. 1B is a perspective view of a portion of a housing for the swasplate compressor that mates with the oil separator.
Figure 1C:
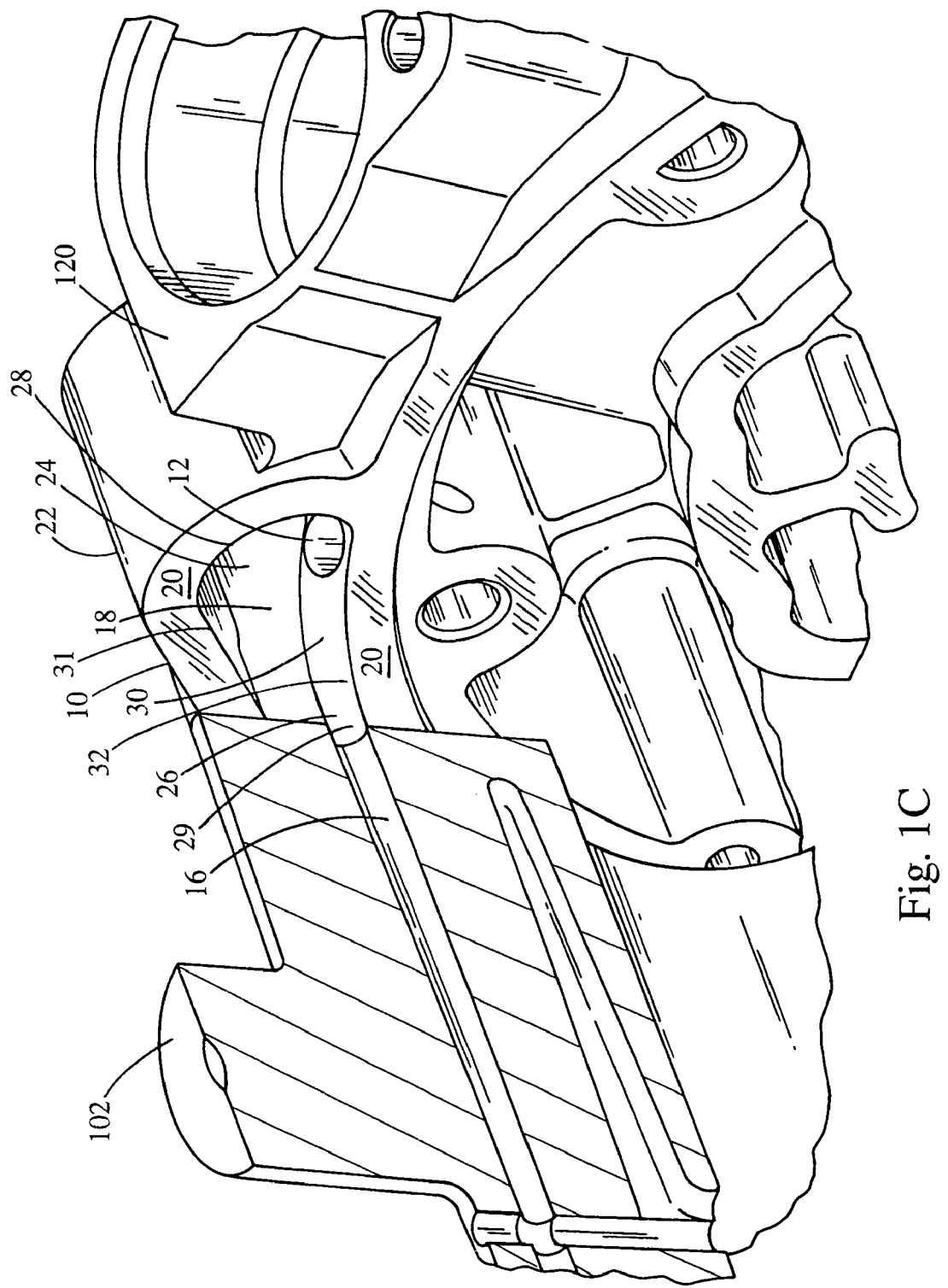
FIG. 1C is a perspective view of the oil separator mated with the housing.

Referring now to the drawings, an oil separator according to the principles of the present invention is illustrated in FIGS. 1A, 1B, and 1C, and is generally designated at 10. The oil separator 10 includes a mixture inlet 12, a gas outlet 14, and an oil outlet 16. In addition, an inner chamber 18 of the separator 10 surrounded by a wall 20 with an exterior surface 22 defines a separator region 24 and an oil accumulation region 26. The separator region 24 provides an impingement surface 28.

As used herein, the term "impingement" refers to the removal of suspended liquid droplets from a flowing stream of gas or vapor by a collision between the stream and a solid surface, such as the impingement surface 28. The collision forces the droplets to fall away from the stream.

The mixture inlet 12 is a passageway that provides communication between the exterior of the separator 10 and the inner chamber 18. For example, the mixture inlet 12 functions as a passageway between the separator 10 and a discharge outlet of a compressor to which the separator is associated. As described in detail below, the separator 10 can be located on the discharge side of the compressor and formed in the rear head of the compressor. The mixture inlet 12 can be an aperture in the wall 20 or it can be a tubular member that traverses the wall 20. The mixture inlet 12 can take any form of a communicative passageway suitable for providing access to the inner chamber 18 of the separator 10. In certain embodiments, the mixture inlet 12 and the discharge outlet of the compressor are one and the same. Ultimately, the size, shape, and form of the inlet 12 will depend on the characteristics of the discharge outlet of the compressor.

The gas outlet 14 provides a communicative passageway from the inner chamber 18, in particular, the separator region 24, of the oil separator 10 to the external environment. For instance, the gas outlet 14 can provide a path through which a gaseous medium, such as a refrigerant, can leave the separator 10 and move onto a condenser after the oil has been separated from the gas. The gas outlet 14 can be an aperture in the wall 20 or it can be a tubular member that traverses through the wall 20, or it can be any other form of a communicative passageway suitable for providing the escape passageway for the gaseous medium.

The oil outlet 16 provides a communicative passageway between the inner chamber 18, in particular, the oil accumulation region 26, of the oil separator 10 to the external environment. The oil outlet functions as an escape passageway through which oil separated from an oil refrigerant mixture leaves the oil separator 10 to be circulated again through the compressor.

The oil outlet 16 can be an aperture in the wall 20, a tubular member that traverses the wall 20 of the separator 10, or it can be any form of a communicative passageway suitable fro providing the escape passageway for the separated oil.

The oil accumulation region 26 is located to the side and angled downward from the separator region 24. That is, the terminal end 29 of the oil accumulation region 26 is lower than the opening 30 between the accumulation region and the separator region, such that both the upper and lower surfaces of the accumulation region 26 slope downward from the opening 30 to the terminal end 29. Thus, oil removed from the oil-refrigerant mixture flows along an upper surface 31 into the accumulator region 26 or falls down onto a lower surface 32, and then, because of the downward slope of the lower surface 32, into the accumulation region 26. In the arrangement shown in FIG. 1, the longitudinal axis of the gas outlet 14 and the oil outlet 16 are substantially parallel to each other, and the longitudinal axis of the mixture inlet 12 is substantially perpendicular to the axes of the gas and oil outlets 14 and 16.

Figure 2A:
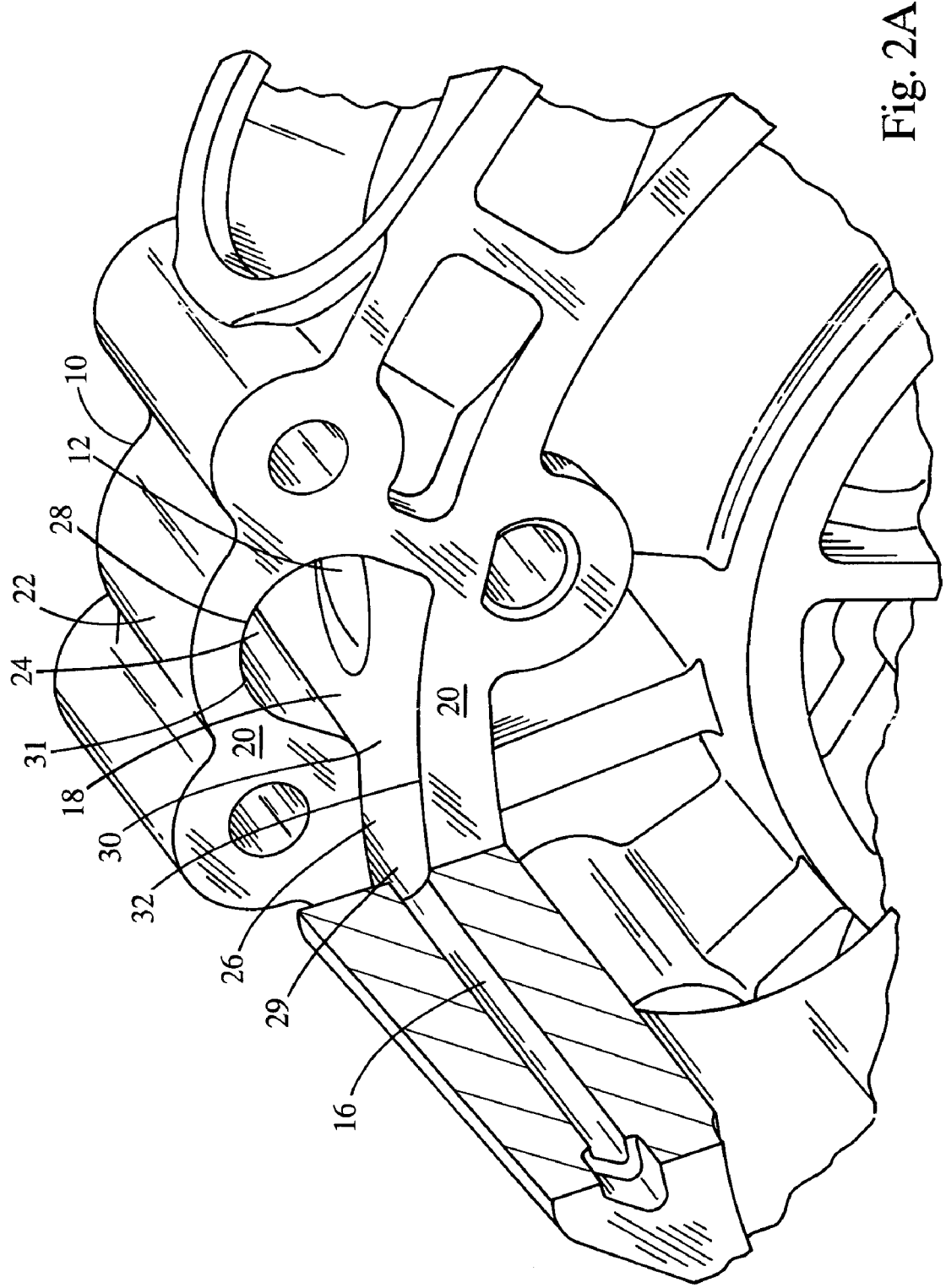
FIG. 2A is a perspective view of an alternative embodiment of an oil separator mated with a housing of a swashplate compressor.
Figure 2B:
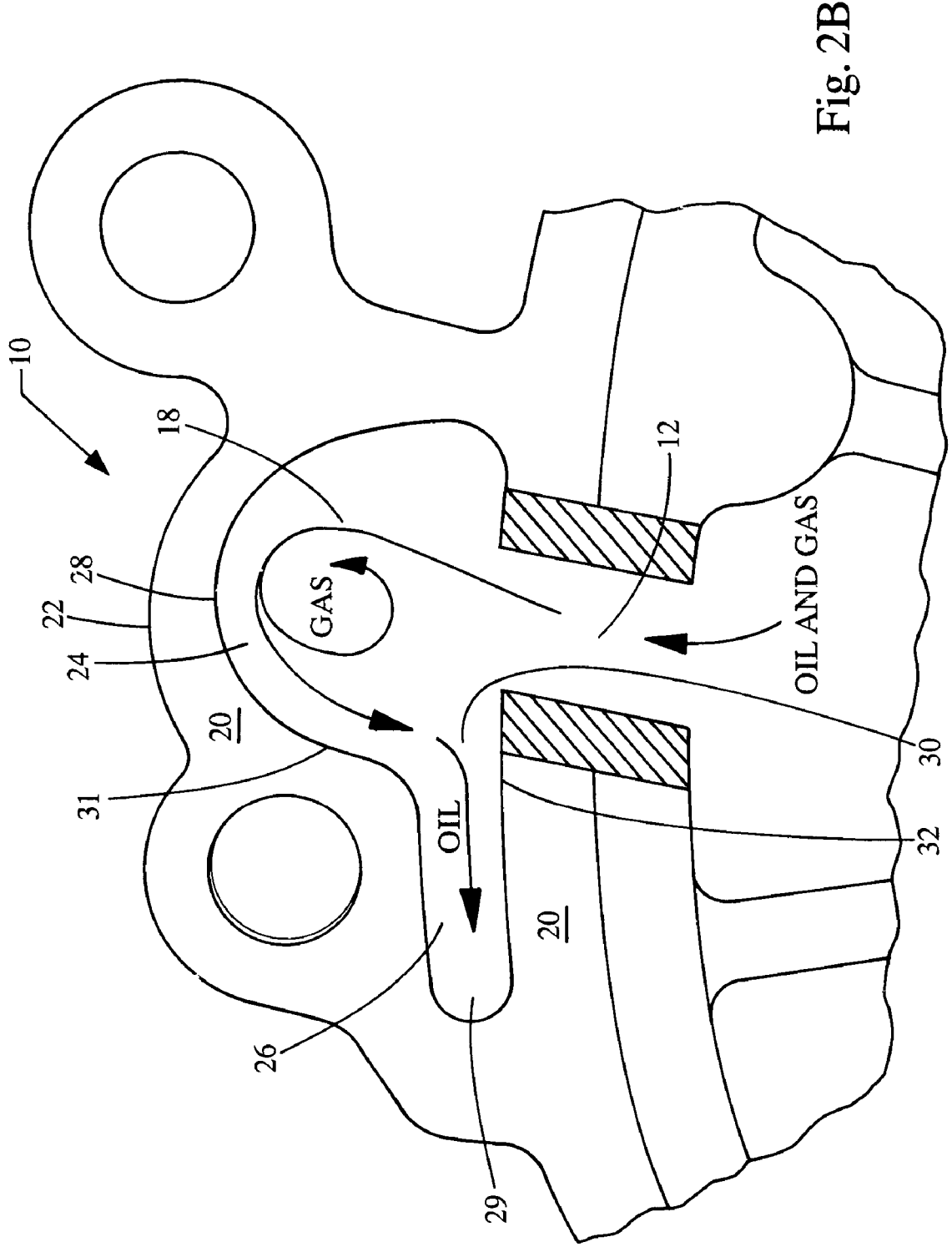
FIG. 2B illustrates the oil-mixture flow in the oil separator of FIG. 2A.

Referring now to FIGS. 2A and 2B, there is shown an alternative embodiment of the oil separator 10. In this embodiment, the impingement surface 28 has a substantially hemispherical shape.

As shown in FIG. 2B, when the separator 10 is in use, a compressed oil and gaseous refrigerant mixture flows from the compressor discharge outlet through the mixture inlet 12 into the inner chamber 18. The oil refrigerant mixture strikes the impingement surface 28. This quickly and abruptly changes the direction of the refrigerant gas, while the heavier oil impinges against the surface causing the oil to separate from the refrigerant gas. The gas then flows out of the inner chamber 18 through the gas outlet 14 (see, e.g., FIG. 1B) to the condenser.

Some of the separated oil may adhere to the upper surface 31 and flow into the accumulation region 26, and some of the oil may fall onto the lower surface 32. In any case, the separated oil ultimately drains downward into the accumulation region 26 toward its lower end 29. As such, the oil collects in the accumulation region 26 and exits from the inner chamber 18 through the oil outlet 16 as the pressure increases during the compression cycle of a particular piston of the compressor.

Accordingly, oil is retained in the compressor, used, for example, in an air conditioning system, to provide constant lubrication to its internal components. This increased lubrication increases the compressor's durability and improves its efficiency. Consequently, the air conditioning system's overall efficiently significantly improves since less oil circulates and deposits onto the heat exchanger's fins and tubes, providing greater heat transfer and hence cooler discharge air through the vehicle's air conditioning registers.

Figure 3:
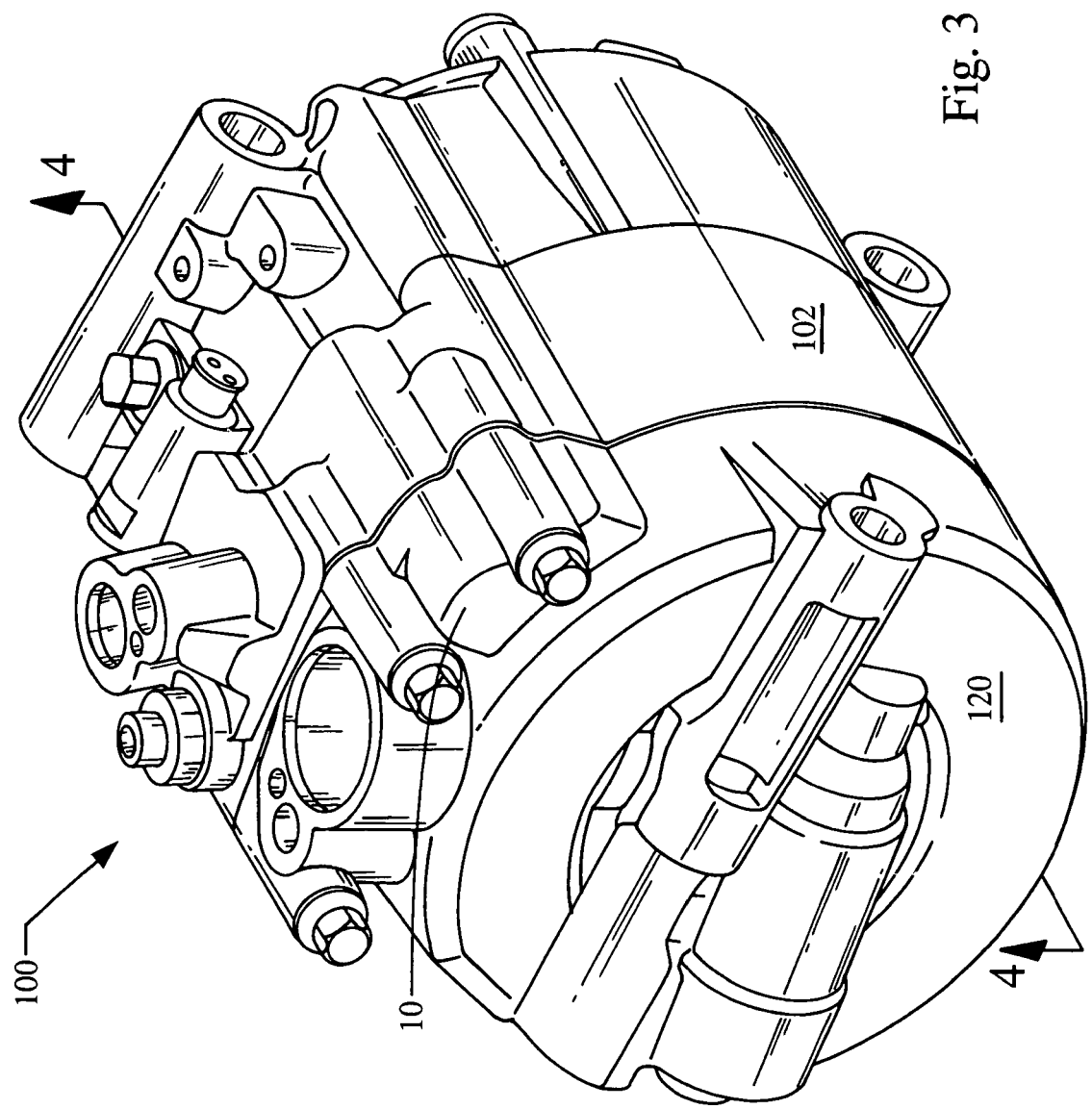
FIG. 3 is a perspective view of a swashplate compressor with the oil separator in accordance with the invention.
Figure 4:
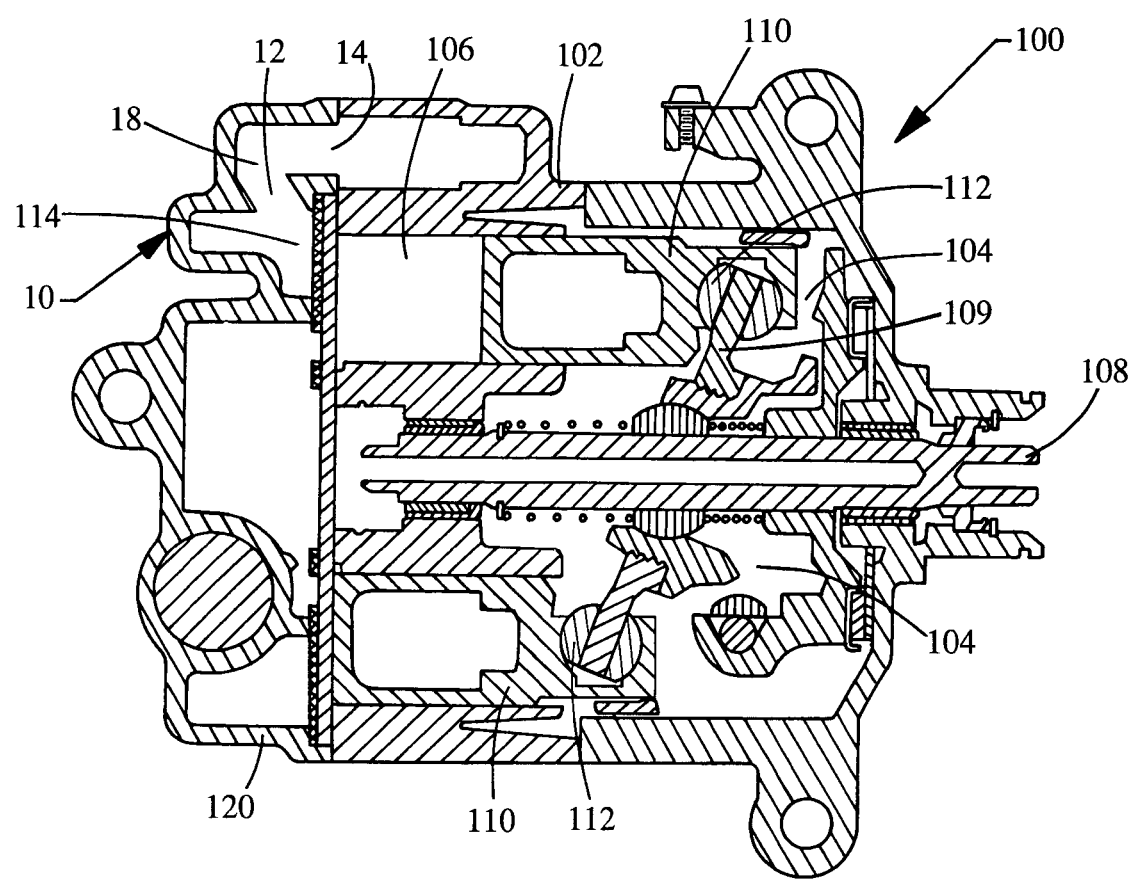
FIG. 4 is a cross-sectional view along the line 4—4 of FIG. 3.

The oil separator 10 of the present invention is particular well suited for incorporation into compressors in refrigeration circuits, such as swashplate compressors typically used in the air conditioning systems of automotive vehicles. An example of a swashplate compressor is shown in FIGS. 3 and 4, and is generally designated at 100. The compressor 100 includes a housing 102 that defines a swashplate chamber 104 and at least one cylinder bore 106. A driveshaft 108 passes through the housing 102 and into the swashplate chamber 104. A swashplate 109 is attached to the end of the shaft 108 at an angle within the chamber 104. Pistons 110 are positioned in the cylinder bores 106, and via shoes 112, are connected to the swashplate 109 such that the rotational movement of the shaft 108 and consequently the swashplate 109 forces the pistons 110 to reciprocate in a linear manner within respective cylinder bores 106 as the pistons 110 move between a top dead center position and a bottom dead center position.

A discharge outlet 114 is in communication with the cylinder bore 106 such that the compressed oil-refrigerant mixture is forced out the discharge outlet 114 into the oil separator 10 through the mixture inlet 12. Referring also to FIG. 2A, the compression from the pistons 110 pushes the separated oil and refrigerant out of the separator 10 through the oil outlet 16 and the gas outlet 14, respectively. The refrigerant then moves into the remainder of the refrigeration circuit. The compressor 100 is provided with a oil return inlet for returning lubricating oil to the swashplate chamber 104 such that it is available for lubricating the moving parts located within the swashplate chamber.

The oil separator 10 can easily be incorporated into a swashplate type compressor 100 by placing the mixture inlet 12 in communication with the discharge outlet 114 and the oil outlet in communication with the oil return inlet. Also, the gas outlet 14 can be connected to the remainder of the refrigeration circuit such that the refrigerant, after being separated from the oil, can flow through the remainder of the circuit.

In this manner, a mist containing oil suspended in a gaseous refrigerant leaves the compressor 100 through the discharge outlet 114 and enters the oil separator 10 through the mixture inlet 12. While in the oil separator 10, the mixture impinges against the hemispherical surface 28 where the oil separates from the refrigerant gas as described earlier. The refrigerant leaves the oil separator 10 through the gas outlet 14 and is able to flow through the rest of the refrigeration circuit. The oil gradually accumulates in the accumulation region 26 and leaves the oil separator 10 through the oil outlet 16 and returns to the compressor 100 through the oil return inlet.

The oil separator 10 can be integrally formed in the rear head 120 of the compressor 100. As such, the separator 10 can be machined in the rear head 120 or it can be formed in the head 120 during a casting operation. The communicative passageways between the compressor 100 and the mixture inlet 12, the gas outlet 14, and the oil outlet 16 of the separator 10 can be integrally formed within the housing 102. Alternatively, these passageways 12, 14, and 16 can be separately attached members.

In various embodiments, the oil separator 10 can be formed from steel, aluminum, or any other suitable material by standard techniques, such as stamping and welding, and connected to the compressor 100 with appropriate connections between the compressor 100 and the mixture inlet 12, the gas outlet 14, and the oil outlet 16.

It is therefore intended that the foregoing detailed description be regarded as illustrative rather than limiting, and that it be understood that it is the following claims, including all equivalents, that are intended to define the spirit and scope of this invention.

What is claimed is:

1. An oil separator for a compressor, comprising:

a wall with an inner surface, the inner surface defining an inner chamber with a separator region and an oil accumulation region, the separator region having an impingement surface;

a mixture inlet that provides a passageway for an oil gaseous refrigerant mixture to flow from the exterior of the separator into the inner chamber of the separator;

a gas outlet that provides a passageway for the gaseous refrigerant from the separator region to the exterior of the separator; and an oil outlet that provides a passageway for separated oil from the accumulation region to the exterior of the separator, the oil being separated from the oil gaseous refrigerant mixture as the mixture impinges against the impingement surface, the separated oil draining into the accumulation region from where the oil exits the separator through the oil outlet, the accumulation region being positioned to the side of the separator region, the juncture between the accumulation region and the separator region defining an entrance to the accumulation region, the accumulation region having a terminal end sloped relative to the entrance so that the separated oi flows from the entrance towards the terminal end.

2. The separator of claim 1, wherein the mixture inlet, the gas outlet, and the oil outlet are apertures in the wall.

3. The separator of claim 1, wherein the mixture inlet, the gas outlet, and the oil outlet are tubular structures that traverse the wall from the exterior of the separator to the inner chamber.

4. The separator of claim 3, wherein the longitudinal axes of the gas outlet and the oil outlet are substantially parallel, and the longitudinal axis of the mixture inlet is substantially perpendicular to the axes of the gas and oil outlets.

5. The separator of claim 1, wherein the impingement surface has a substantially hemispherical shape.

* * * * *